United States Patent [19]

Eisend et al.

[11] 4,363,390
[45] Dec. 14, 1982

[54] RATCHET GEAR FOR THE DRIVING HUB OF A BICYCLE

[75] Inventors: Ewald Eisend, Grafenrheinfeld; Josef Keller, Schweinfurt, both of Fed. Rep. of Germany

[73] Assignee: Fichtel & Sachs AG, Schweinfurt, Fed. Rep. of Germany

[21] Appl. No.: 199,455

[22] Filed: Oct. 22, 1980

[30] Foreign Application Priority Data

Nov. 7, 1979 [DE] Fed. Rep. of Germany ... 7931360[U]

[51] Int. Cl.³ .................................... F16D 41/12
[52] U.S. Cl. ................................. 192/46; 74/577 S; 192/64
[58] Field of Search ............... 192/64, 46; 74/577 S, 74/750 B; 188/82.7, 82.77

[56] References Cited

U.S. PATENT DOCUMENTS

| | | | |
|---|---|---|---|
| 1,429,196 | 9/1922 | Dughera | 192/64 |
| 3,166,171 | 1/1965 | Schwerdhofer | 192/64 |
| 4,059,028 | 11/1977 | Schulz et al. | 74/750 B X |
| 4,147,243 | 4/1979 | Segawa et al. | 74/750 B X |

FOREIGN PATENT DOCUMENTS

| | | |
|---|---|---|
| 491109 | 8/1938 | United Kingdom . |
| 564864 | 10/1944 | United Kingdom . |
| 591006 | 8/1947 | United Kingdom . |
| 908128 | 5/1959 | United Kingdom . |
| 943326 | 5/1961 | United Kingdom . |

*Primary Examiner*—Allan D. Herrmann
*Attorney, Agent, or Firm*—Toren, McGeady & Stanger

[57] ABSTRACT

A ratchet gear, particularly for driving hubs of bicycles, having a pawl mounted in a pawl carrier without the use of bolts. The head of the pawl is provided with a securing surface which, even when the pawls occupy the engaged position, is situated opposite an intercepting surface of the pawl carrier, in the peripheral direction about the pivot, so that the partly cylindrical bearing foot of the pawl cannot be moved out of the partly cylindrical bearing bushing to any great extent and it is impossible for the head of the pawl to become jammed between the pawl carrier and the gear carrier.

5 Claims, 1 Drawing Figure

U.S. Patent  Dec. 14, 1982  4,363,390
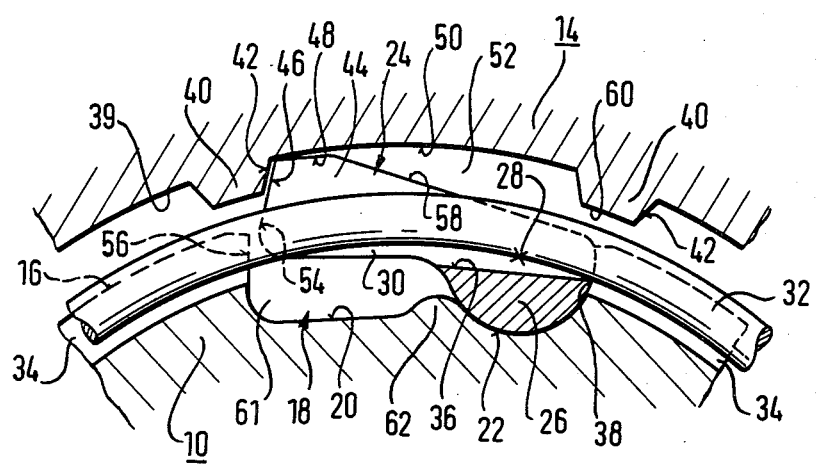

RATCHET GEAR FOR THE DRIVING HUB OF A BICYCLE

BACKGROUND TO THE INVENTION

The invention relates to a ratchet gear for the driving hub of a bicycle comprising a pawl carrier rotatable about a pivot and at least one pawl on the said pawl carrier and a gear carrier likewise rotatable about the pivot and having at least one entrainer tooth pointing in the radial direction towards the pawl carrier, wherein the pawl, in its operating position, is mounted, so as to be pivotable about a swivel axis, and by means of a partly cylindrical bearing base axially parallel to the pivot, in a correspondingly partly cylindrical bearing bushing of the pawl carrier, and wherein the pawl is provided, in the zone of its head, at a distance from the bearing base, with an entrainer surface, and wherein the pawl is biased by pawl biasing means in and engagement position in which the entrainer surface of the pawl is situated opposite to an entrainer flank of the entrainer tooth, as viewed in the peripheral direction about the pivot, for the purpose of mutually interlocking the pawl carrier and the gear carrier in their relative rotation in a first direction of relative rotation about the pivot, and wherein the pawl, by interacting control surfaces, of the pawl and of the gear carrier, in the case of relative rotation of the pawl carrier and of the gear carrier in a second and opposite direction of relative rotation, is deflectable about the swivel axis, so that the pawl can slide over and past the entrainer tooth.

STATEMENT OF PRIOR ART

Ratchet gears of this kind are used, for example, in order, in the driving hub of a bicycle, to transmit the driving moment from part of the planetary gearing to the hub sleeve.

In the known ratchet gears of this kind the pawls are approximately drop-shaped in cross section, i.e. taper considerably from the bearing base to the head, so that only a comparatively narrow entrainer surface is formed on the latter.

It has been found, however, that the known ratchet gears involve risks of operating faults under highly unfavourable conditions:

In the event of major impact or vibrations, for example, when the bicycle equipped with the driving hub is ridden over a road hole, the bearing base may be lifted out of the bearing bushing and become jammed by its tapered head between the pawl carrier and an entrainer tooth of the gear carrier. This is particularly liable to occur if only one single entrainer tooth or a small number of entrainer teeth are distributed over the periphery of the gear carrier. The ratchet gear and the entire driving hub are then blocked and furthermore cannot be released by the introduction of a rotatory motion into the said hub.

OBJECT OF THE INVENTION

An object of the invention is to construct a ratchet gear of the type mentioned at the beginning in such a way that the risk of operating faults of this kind will be completely eliminated.

SUMMARY OF THE INVENTION

In order to achieve this object the invention provides that the head belonging to the pawl and situated at a distance from the bearing base bears a securing surface which is also situated opposite an intercepting surface of the pawl carrier, as viewed in the peripheral direction about the pivot, when the pawl occupies the engaged position.

In order to simplify the production process it is of advantage if the securing surface is formed by a smooth prolongation of the entrainer surface.

The securing surface must naturally be situated at a distance from the intercepting surface, so that the pawl, in normal operation, pivots freely about its swivel axis. On the other hand it is desirable for the securing surface to be situated opposite the intercepting surface of the pawl carrier and at as short a distance as possible from the latter, so that on the impact of the securing surface against the intercepting surface, as a result of the fact that the partly cylindrical bearing base is lifted out its operating position, in the partly cylindrical bearing bushing, the partly cylindrical bearing base is still partly engaged in the partly cylindrical bearing bushing, and can return to its operating position within the partly cylindrical bearing bushing, under the influence, for example, of the pawl biasing means.

It is possible for the pawl, in a manner known per se, to be situated in a compartment which belongs to the pawl carrier and which is open in the radial direction and in the floor of which the bearing bushing is formed, a boundary surface of this compartment forming the intercepting surface.

In order to enable the partly cylindrical bearing surfaces of the bearing bushing and of the bearing base to expand over the maximum possible sector angle without thereby limiting the pivotability of the pawl about the swivel axis, it is likewise of advantage if a sill is formed on the floor of the compartment, between the bearing bushing and a chamber which accommodated the pawl head on the deflection of the pawl.

The pawl may be provided, in a manner known per se, with a stop face which is situated opposite to the gear carrier as viewed in the radial direction and which, in the entrainment position, rests against the base surface of a tooth gap belonging to the gear carrier and adjacent to the entrainer tooth and thus determines the engagement position of the pawl. This stop face may be identical with the aforementioned control surface of the pawl or form a part of this control surface.

The pawl may be provided, in a manner known per se, with a slit substantially perpendicular to the pivot and open towards the gear carrier; this slit may accommodate a spring ring which is substantially concentric with the pivot and which interacts with the base of the slit in order to form the pawl biasing means. In this case the spring ring may also engage a slit belonging to the pawl carrier and substantially perpendicular to the pivot and open towards the gear carrier, in order to determine the exact position of the pawl in the direction of the pivot.

The pawl construction according to the invention is particularly applicable when the pawl is mounted on an external peripheral surface of the pawl carrier and the entrainer tooth on an internal peripheral surface of the gear carrier. The converse solution is also conceivable, however, in which the pawl is mounted on an internal peripheral surface of the pawl carrier and the entrainer tooth on an external peripheral surface of the gear carrier.

BRIEF DESCRIPTION OF THE DRAWING

The invention will be explained below in greater detail by reference to an example illustrated schematically in the attached drawing, which shows, partly in section, a ratchet gear designed in accordance with the invention and and forming part of the driving hub of a bicycle, the sectional plane being perpendicular to the pivot.

DESCRIPTION OF PREFERRED EMBODIMENT

In the drawing a pawl carrier is marked 10. This pawl carrier 10 is mounted so as to rotate about a pivot 12. The pawl carrier 10 is surrounded by a gear carrier 14 likewise rotatable about the pivot 12.

A compartment 18 is formed in the external peripheral surface 16 of the pawl carrier 10. This compartment 18 is provided, on its floor 20, with a partly cylindrical bearing bushing 22. A pawl 24 with a partly cylindrical bearing base 26 is pivotably mounted in the partly cylindrical bearing bushing 22, the swivel axis being marked 28. The bearing base has a convex bearing surface extending over an angle of less than 180° about the swivel axis 28.

The pawl 24 has a slit 30 substantially perpendicular to the pivot 12 and to the swivel axis 28. This slit 30 accommodates an open spring ring 32 which, on the pawl carrier 10, is accommodated in a slit 34 likewise perpendicular to the pivot 12. The spring ring 32 tends to contract in the radial direction, in which process it presses on the floor 36 of the slit 30 at the point 38 in such a way that it tends to rotate the pawl 24 about the swivel axis 28 in the clockwise direction as shown in the drawing.

The internal peripheral surface 39 of the gear carrier 14 bears entrainer teeth 40 situated at even distances apart over the periphery. These entrainer teeth 40 have entrainer flanks 42.

The head 44 of the pawl 24 is provided with an entrainer surface 46. A stop face 48 is also provided on the head 44 of the pawl 24. When the stop face 48 is in the engaged position, the stop face 48 rests against the base surface 50 of a tooth gap 52 defined between the two entrainer teeth 40, under the effect of the spring ring 32. The entrainer surface 46 of the pawl 44 is then situated opposite the entrainer flank 42 of the entrainer tooth 40, in the peripheral direction about the pivot 12. This ensures that when the pawl carrier 10 performs a rotation about the pivot 12 in the anti-clockwise direction the gear carrier 14 will be entrained by the pawl carrier 10 via the pawl 24.

The head 44 of the pawl 24 possess a securing surface 54 immediately following the entrainer surface 46. In the operating position shown in the drawing this securing surface 54 is situated, in the peripheral direction about the pivot 12, opposite to an intercepting surface 56 which at the same time forms the terminal surface of the compartment 18.

The distance between the securing surface 54 and the intercepting surface 56, as may be seen from the drawing, is very small, so that the pawl 24 can be pivoted about the swivel axis 28, in an anti-clockwise direction, without any impact between the surfaces 54 and 56.

If the foot 26 of the pawl 24, as a result of an impact on the bicycle, jumps out of the bearing bushing 22, it can never be jammed between the external peripheral surface 16 of the pawl carrier and the gear carrier 14, because its securing surface 54 encounters the intercepting surface 56, unless it already makes impact by the entrainer surface 46 against the entrainer flank 42.

If the pawl carrier 10 is stationary and the gear carrier 14 rotates about the pivot 12 in an anti-clockwise direction, opposite to the pawl carrier 10, then the control surface 58 of the pawl 24 engages a control surface 60 of the entrainer tooth 40 shown in the right hand portion of the drawing. In this process the head 44 of the pawl is pressed inwards in the radial direction and the pawl 24 pivoted in an anti-clockwise direction about the swivel axis 28. This enables the pawl 24 to slide pass the right-hand entrainer tooth 40. The head 44 of the pawl then enters the chamber 61 of the compartment 18. Between this chamber 61 and the bearing bushing 22 is a sill 62 which extends above the floor 20 of the pocket 18, so that the bearing bushing 22 and the bearing base 26 can rest against one another over an ample sector angle about the swivel axis 28 without impeding the radial inward pivoting movement of the head 44.

The pawl carrier 10 is connected to the planetary gear carrier or the hollow wheel of a planetary gearing in such a way as to be non-rotatable in relation thereto, while the gear carrier 14 is connected, for example, to a hub sleeve or driving hub, in such a way as to be non-rotatable in relation thereto.

It may be seen from the drawing that the stop face 48 forms approximately a right angle with the entrainer surface 46 and that the securing surface 54 continues as the entrainer surface 46 without a break.

It is essential that when the pawl 24 occupies the operating position shown in the drawing the intercepting surface 56 of the pawl carrier 10 and the securing surface 54 overlap in the radial direction, with reference to the pivot 12.

The distance between the securing surface 54 and the intercepting surface 56 is so short that the partly cylindrical bearing base 26 can never emerge completely from the bearing bushing 22 of the pawl carrier 10 and will always remain partly engaged in the bearing bushing 22, so that after any violent impact by which the partly cylindrical bearing base 26 has been partly expelled from the partly cylindrical bearing bushing 22 the bearing base 26 will automatically return to the bearing bushing 22 under the effect of the spring ring 32.

If, as shown in the attached drawing, with the pawl carrier 10 stationary, the gear carrier 14 rotates anti-clockwise, then the entrainer tooth 40 shown in the right-hand portion of the drawing will entrain the pawl 24 in the anti-clockwise direction, as a result of the frictional engagement between the control surfaces 58 and 60. In this process, however, the pawl cannot be drawn out of the bearing bushing 22, because the securing surface 54 encounters the stop face 56.

In the construction according to the invention the pawl head 44 is far thicker in the radial direction than in constructions so far known. This special design for the pawl 24 offers the additional advantage that incorrect assembly of the pawl is either impossible or immediately detectable: if the left-hand portion is inadvertently placed on the right and vice-versa the securing surface 54 will already make impact with the floor of the compartment 18 before an entrainer tooth 40 is able to slide and past the pawl 24. It can thus be immediately seen if the ratchet gear has been mounted incorrectly.

We claim:

1. A ratchet gear to be used in a bicycle hub and the like comprising:
   a pawl carrier (10) rotatable about a first axis (12),
   at least one pawl (24) pivotally mounted on said pawl carrier (10) about a second axis (28), a gear carrier (14) also rotatable about said first axis (12), entrainer teeth (40) on said gear carrier (14) for engagement with said pawl (24),
   said pawl (24) comprising a bearing base (26) and an engagement head (44), said bearing base (26) comprising a partly cylindrical segment-shaped convex bearing surface extending over an angle of less than 180° about the second axis,
   said pawl carrier (10) comprising a recess-like compartment (18) for receiving said pawl (24), said compartment (18) comprising a partly cylindrical segment-shaped concave bearing bushing (22) for receiving said convex bearing surface of said pawl (24),
   a sill portion (62) adjacent said bearing bushing (22), and a floor portion (20) adjacent said sill portion (62) on the side of said sill portion (62) remote from said bearing bushing (22),
   said engagement head (44) being provided with an entrainer surface (46) extending transversely of the circumferential direction of said pawl carrier for engagement with respective entrainer flanks (42) of said entrainer teeth (40), and said engagement head (44) being in contact with said gear carrier (14) when said convex bearing surface of said bearing base (26) is received in said bearing bushing (22),
   biasing means (32) for biasing said pawl (24) toward engagement with said entrainer teeth (40), said biasing means (32) comprising a spring ring circular about said first axis (12) and having an intermediate portion received within a slot (30) in said pawl (24) and engaging the floor (36) of said slot (30),
   said entrainer surface (46) of said engagement head (44) having a securing surface (54) extending inwardly therefrom and movable toward said floor portion (20) of said compartment (18), from the position where said engagement head (44) contacts said gear carrier (14), said floor portion (20) of said compartment (18) having an intercepting face (56) extending transversely of the circumferential direction of said pawl carrier, said securing surface (54) facing said intercepting face (56) in the direction extending transversely of the circumferential direction of said pawl carrier when said entrainer surface (46) of said engagement head (44) engages said entrainer flank (42) of a respective entrainer tooth (40),
   the spacing of said securing surface (54) and of said intercepting surface (56) when said engagement head (44) contacts said gear carrier (14) being such that on unintended approach of said pawl (24) toward said intercepting surface (56) until contact of said intercepting surface (56) and said securing surface (54) causing partial removal of said convex bearing surface out of said concave bearing bushing (22) said convex bearing surface is returned into said concave bearing bushing (22) by said biasing means and slides on the flank of said concave bearing bushing (22) adjacent said sill portion (62), and
   the radius of said convex bearing surface and of said concave bearing bushing being substantially greater than the spacing of said securing surface (54) and said intercepting surface (56) when said engagement head (44) contacts said gear carrier (14).

2. Ratchet gear in accordance with claim 1, characterised by the fact that the securing surface is formed by a smooth prolongation of the entrainer surface.

3. Ratchet gear in accordance with claim 1, characterized by the fact that the pawl is provided with a stop face which is situated opposite to the gear carrier as viewed in the radial direction and which, in the entrainment position, rests against the base surface of a tooth gap belonging to the gear carrier and adjacent to the entrainer tooth and thus determines the engagement position of the pawl.

4. Ratchet gear in accordance with claim 1, characterized by the fact that the spring ring engages a slit in the pawl carrier disposed in a plane substantially perpendicular to the first axis and being open towards the gear carrier.

5. Ratchet gear in accordance with claim 1, characterized by the fact that the pawl is mounted on an external circumferential surface of the pawl carrier and the entrainer tooth is located on an internal circumferential surface of the gear carrier.

* * * * *